United States Patent [19]

Umetsu et al.

[11] Patent Number: 5,130,508
[45] Date of Patent: Jul. 14, 1992

[54] WIRE THREADING METHOD FOR A WIRE DISCHARGE MACHINE

[75] Inventors: Masahito Umetsu, Atsugi; Shigeharu Yokomichi, Isehara, both of Japan

[73] Assignee: Amada Wasino Company, Limited, Japan

[21] Appl. No.: 394,643

[22] Filed: Aug. 16, 1989

[30] Foreign Application Priority Data

Aug. 16, 1988 [JP] Japan .................. 63-202792

[51] Int. Cl.⁵ .................................. B23H 7/02
[52] U.S. Cl. ........................ 249/69.12; 148/139
[58] Field of Search ............ 219/69.12; 140/139, 140/140, 147

[56]       References Cited
       U.S. PATENT DOCUMENTS

| 3,912,899 | 10/1975 | Lehmann et al. | 219/69.12 |
| 3,987,270 | 10/1976 | Ullmann et al. | 219/69.12 |
| 4,379,959 | 4/1983  | Inoue          | 219/69.12 |
| 4,618,761 | 10/1986 | Inoue et al.   | 219/69.12 |
| 4,698,478 | 10/1987 | Girardin       | 219/69.12 |
| 4,743,730 | 5/1988  | Martin et al.  | 219/69.12 |
| 4,778,972 | 10/1988 | Josserand      | 219/69.12 |

FOREIGN PATENT DOCUMENTS 0206041 12/1986 European Pat. Off. .
58-132421 8/1983 Japan .................. 219/69.12

Primary Examiner—Geoffrey S. Evans
Attorney, Agent, or Firm—Wigman & Cohen

[57] ABSTRACT

In a wire discharge machine, threading of the wire is accomplished by tensioning the wire to straighten same and applying an electric current thereto to facilitate separation thereof. Clamps hold and help tension the wire by securing one or more ends at a particular location. The tensioning is accomplished with drive motors, which may be or include pulse motors.

3 Claims, 4 Drawing Sheets

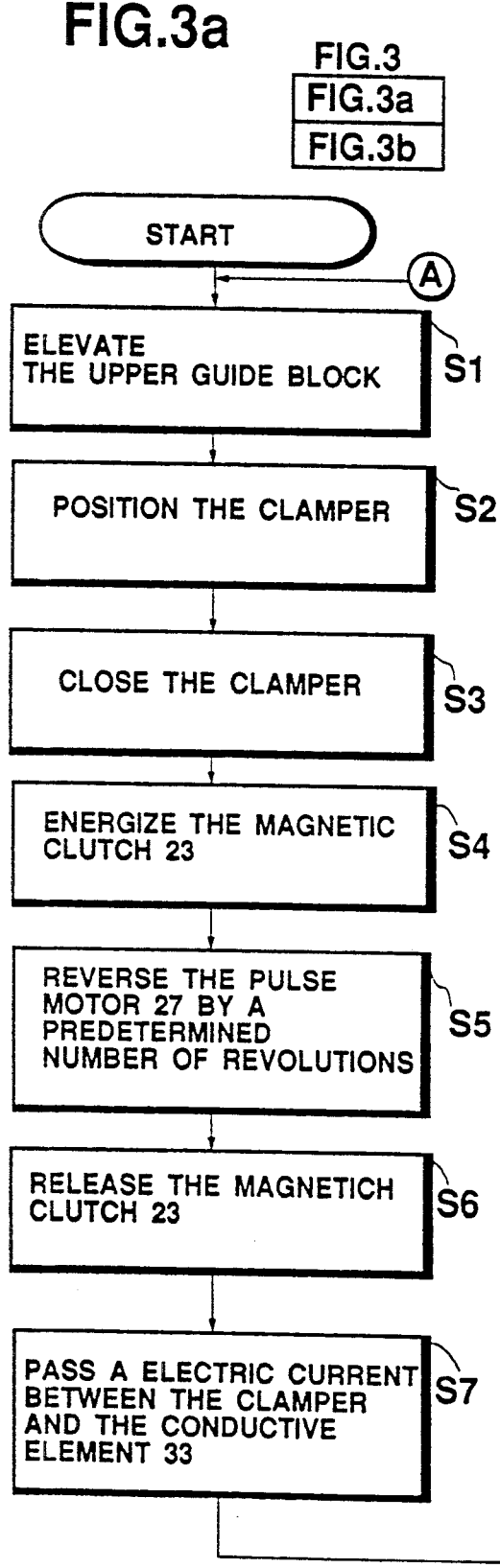
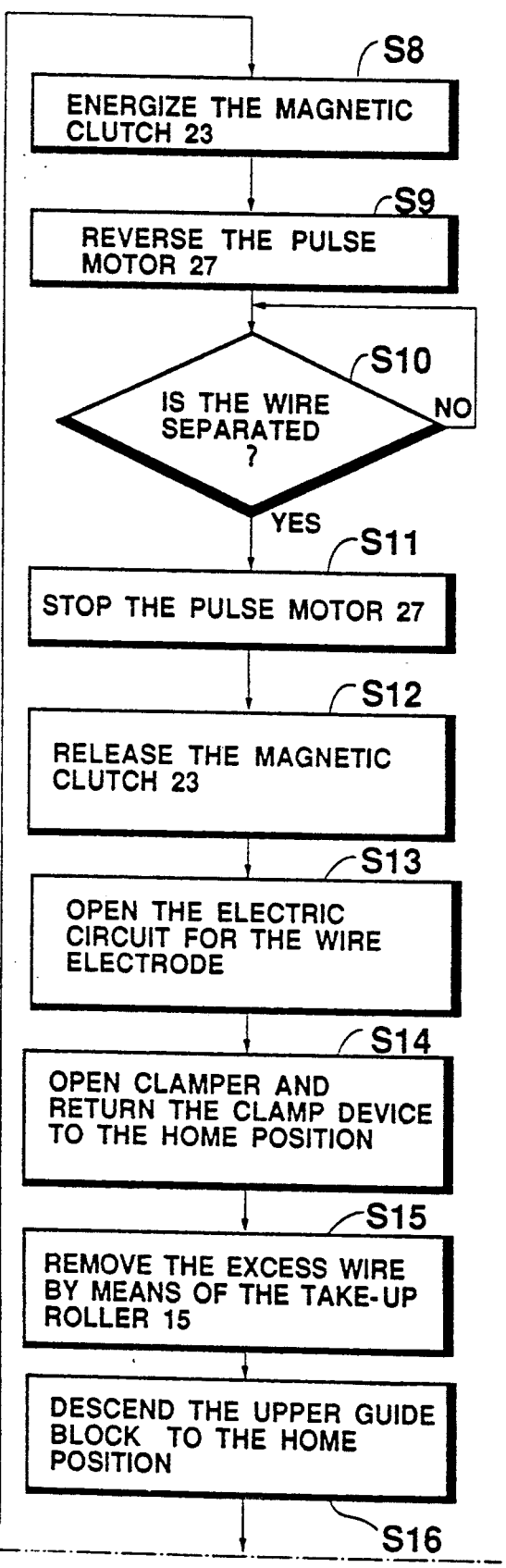
FIG.3a
FIG.3
FIG.3a
FIG.3b

WIRE THREADING METHOD FOR A WIRE DISCHARGE MACHINE

BACKGROUND OF THE INVENTION

1. Field of the Invention

The present invention relates to method for threading a wire in a wire discharge machine.

2. Description of the Prior Art

In a wire discharge machine, when the processing of one section of a workpiece is completed and the process is moved to another section for processing, it is necessary to cut the wire electrode and perform a so-called wire threading operation wherein the wire electrode is inserted into a starting hole for a new processing section. In the threading operation, a wire electrode is cut by passing a current through it to melt the wire. However, a winding pattern is generally imprinted in the wire electrode when it is wound on a bobbin, and this pattern remains in the melted wire electrode. Accordingly, feeding the wire through a small-diameter starting hole into a lower wire guide is not necessarily easy.

For this reason, various methods such as those shown in FIG. 1a, 1b, and 1c are used conventionally. In FIG. 1a, a straight-through pipe guide P for guiding the wire only at the time when it is to be threaded is positioned directly under an upper wire guide g and the wire electrode 1 is fed through by a wire feed roller r to penetrate a workpiece W. In FIG. 1b, a small-diameter orifice o is provided below the upper wire guide g. Process liquid is sprayed through the orifice o, and while the wire electrode 1 is still covered with the process liquid it is fed by the wire feed roller r to penetrate the workpiece W. In FIG. 1c, the upper wire guide g provided on the lower end of a pipe guide g is moved close to the upper surface of the workpiece W and the wire electrode 1 is fed through by the wire feed roller r to penetrate the workpiece W.

In such conventional methods the following types of problems arise. Specifically, in the method of FIG. 1a, the pipe guide is divided into two parts in the vertical direction so as for each of the parts to advance toward and retreat from the processing section before and after the thread operation. Thus, the structure is complicated. In particular, considerable time and trouble is expended in maintenance. In the method shown in FIG. 1b, when the tapering process is performed, the lower end of the orifice obstructs the wire electrode. Thus the angle of taper is limited. In the method of FIG. 1c, the rigidity of the pipe guide g which maintains the lower wire guide g is low so that accurate positioning of the wire guide is difficult.

SUMMARY OF THE INVENTION

An object of the present invention is to provide, with due consideration to the drawbacks of such conventional devices, a threading method which does not require an auxiliary means such as the devices outlined above.

This object of the present invention is achieved by the provision of a threading method for splicing a wire in a wire discharge machine by a process comprising the steps of straightening the wire electrode by applying tension exceeding the limit of elasticity thereof; melting a portion of the straightened wire electrode by passing electric current therethrough; separating the wire electrode at the melted portion thereof by applying tension to the wire electrode; and inserting either end of the separated wire electrode into a through-hole in a workpiece.

In the threading method of this invention, prior to being cut, the wire electrode is stretched beyond its elastic limit so that plastic deformation occurs and the diameter becomes smaller as it stretched while it is being straightened. This eliminates the pattern imprinted in the wire when it is wound on the bobbin. Next, an electric current is caused to flow to melt the part of the wire electrode which has been stretched. Even after being melted the wire electrode retains its straightness. Accordingly, it becomes easy to thread the wire electrode through the through-hole in the workpiece, which is positioned directly below, and into the lower wire guide.

BRIEF DESCRIPTION OF THE DRAWINGS

These and other objects, features, and advantages of the present invention will become more apparent from the following description of the preferred embodiments taken in conjunction with the accompanying drawings, in which:

FIG. 3, 3a, and 3b show a flow chart for the embodiment of the present invention.

DETAILED DESCRIPTION OF THE PREFERRED EMBODIMENTS

Figure 1A:
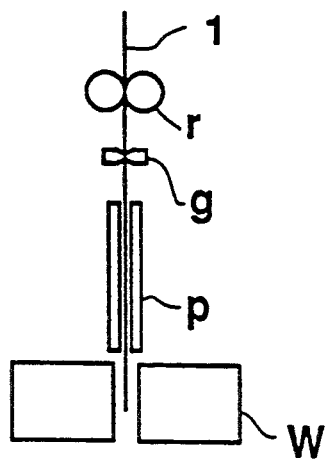
FIGS. 1a, 1b and 1c show explanatory drawings of a conventional auxiliary means.
Figure 1B:
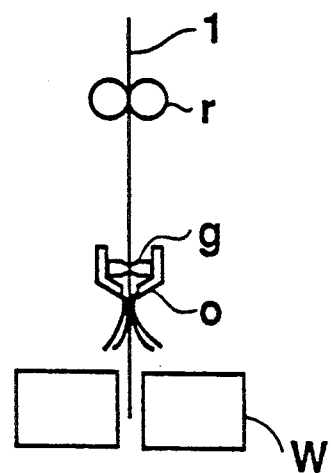
Figure 1C:
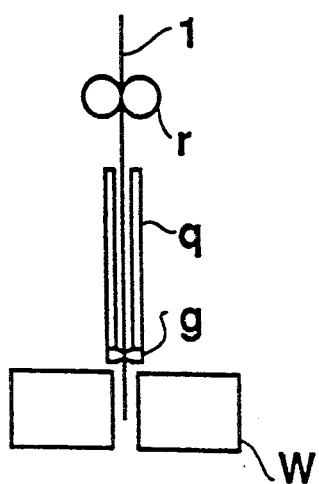
Figure 2:
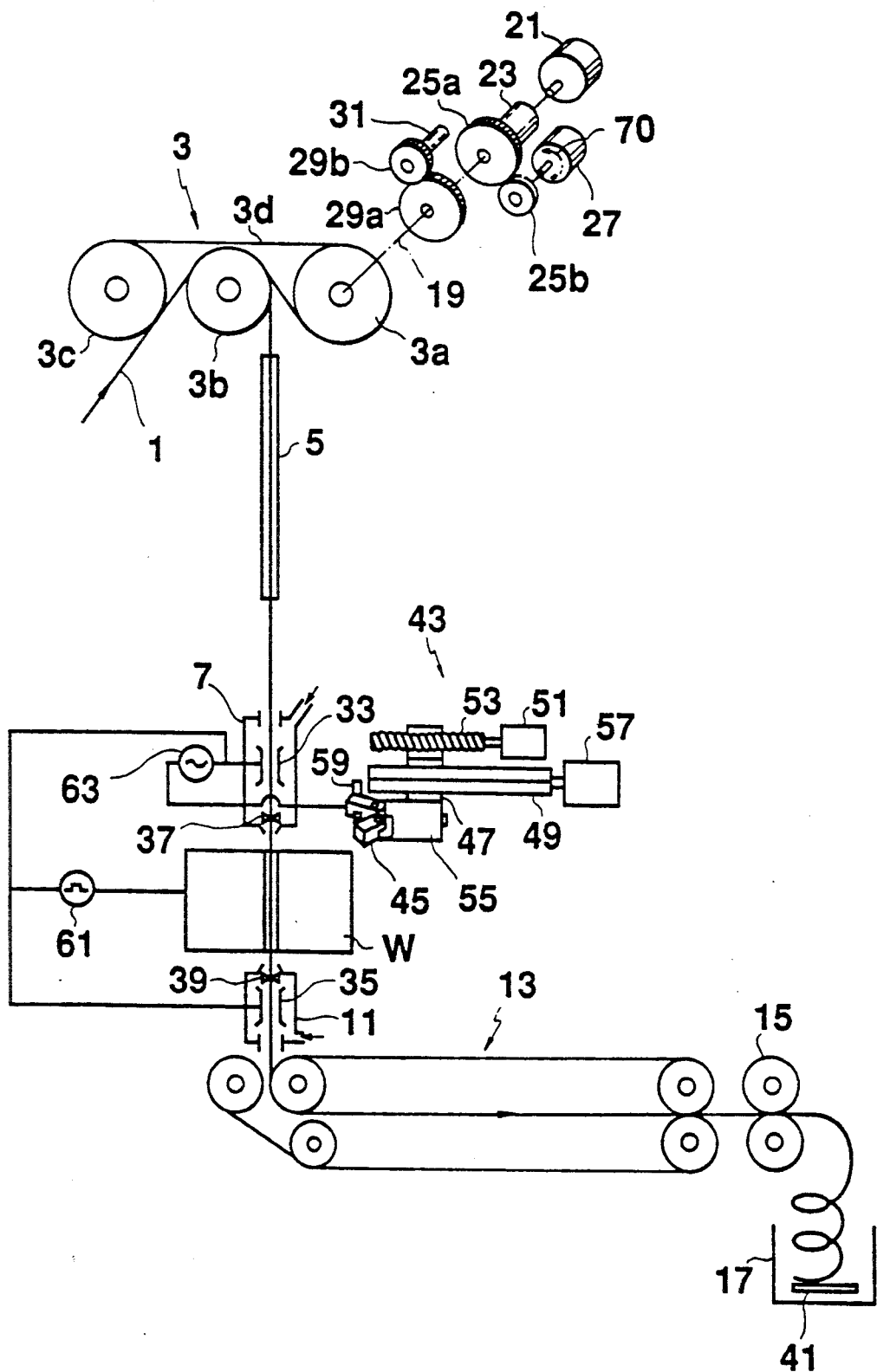
FIG. 2 is an explanatory drawing of a wire travel system of a wire discharge machine to be used in an embodiment of the present invention.

Now referring to FIG. 2 which is an explanatory drawing of the wire travel system of the discharge process machine of the present invention, specifically, a wire electrode 1 is fed from a bobbin (omitted from drawing) and passes through a tension device 3, a wire-guide pipe 5, and an upper guide block 7, and after the electric discharge is performed on a workpiece W, the wire electrode is recovered in a wire retrieval box 17 after passing through a lower guide block 11, a conveying device 13, and a take-up roller 15.

The tension device 3 comprises a drive roller 3a, a tension roller 3b, and an idler roller 3c and the like, around which rollers runs a belt 3d. A brake device 21 is installed on the shaft 19 of the drive roller 3a. In addition, a magnetic clutch 23, a pulse motor 27 through a pair of gears 25a, 25b, and a rotary encoder 31 through a pair of gears 29a, 29b, used in the threading operation, are installed on the shaft 19. The rotary encoder 31 confirms whether or not the wire electrode 1 has reached the conveying device 13 by detecting the change in velocity when the threading occurs, because the velocity of the conveying device 13 is slightly greater than the feed velocity of the wire electrode 1 imparted by the pulse motor 27.

A pair of conductive elements 33, 35 and a pair of wire guides 37, 39 are built into the upper guide block 7 and the lower guide block 11 respectively. Process liquid sprayed from a nozzle section in the direction of the arrows flows over each of these conductive elements 33, 35 and wire guides 37, 39. The conveying device 37 comprises an upper belt and a lower belt between which the wire electrode 1 is interposed and conveyed in the direction of the arrow. A thread condition confirming detection plate 41 is mounted on the bottom of the wire retrieval box 17. Finally, when the wire electrode 1 contacts the plate 41, an electrical circuit is closed and the wire splice is confirmed.

When the wire electrode 1 is to be cut, a clamp device 43 secures the wire electrode 1 by means of a clamper 45, and passes electric current through it. The clamper 45 is mounted on a bracket 47. The bracket 47 can be freely moved along a spline shaft 49 in the lateral direction by a motor 51 and a threaded shaft mechanism 53. The clamper 45 is opened and closed by an air cylinder 55 and the clamp device 43 is elevated by a motor 57. A regenerator block 59 for ensuring a uniform cutting position for the wire electrode 1 is mounted on the clamper 45. A power device 61 for the electric discharge process is connected between the conductive elements 33, 35 built into the upper and lower guide blocks 7, 11 respectively, and the workpiece W; also, a power device 63 for cutting the wire electrode 1 is connected between the conductive element 33 and the clamper 45.

Figure 3B:
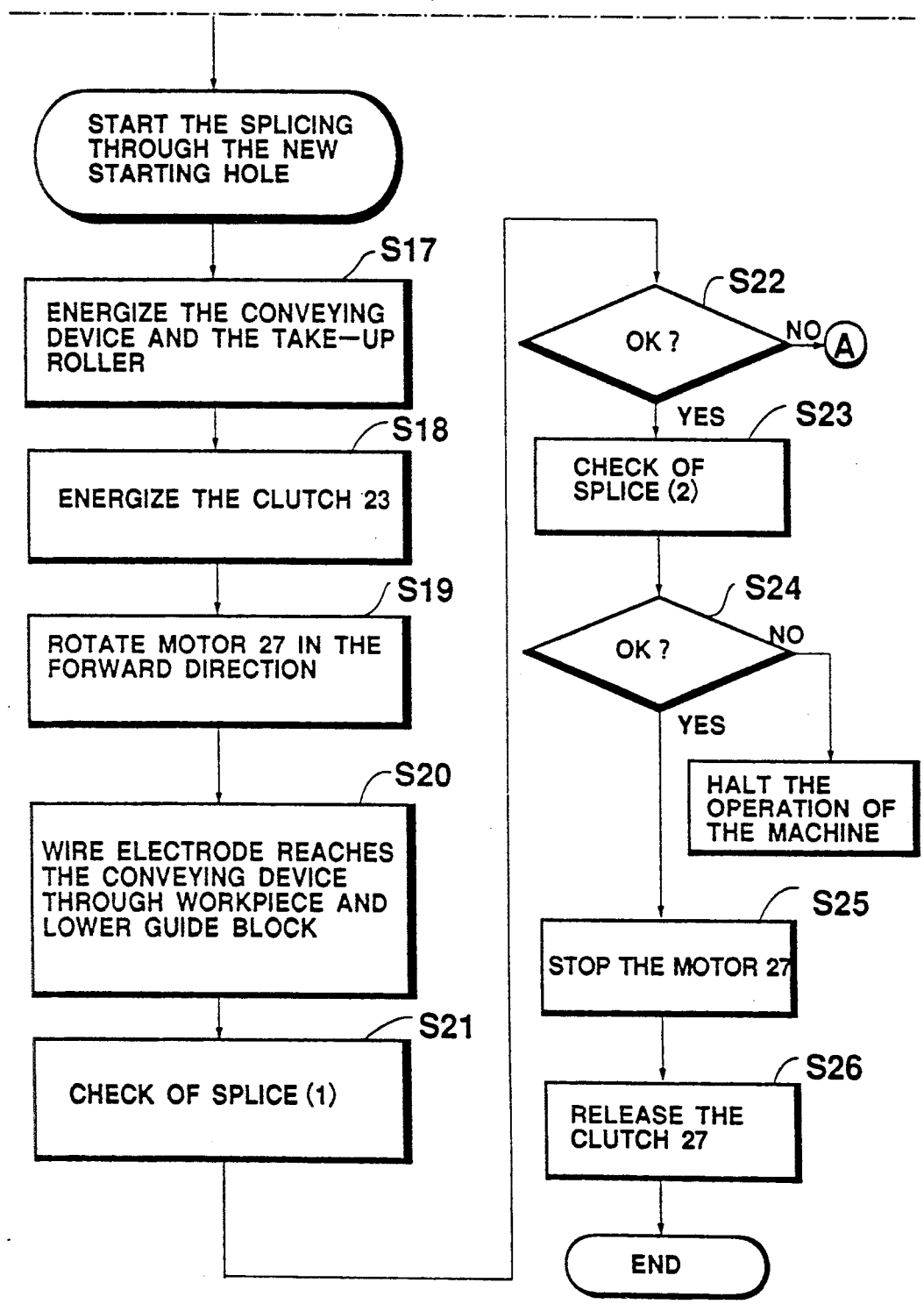

Next, the threading operation by this device will be explained with reference to the flowchart of FIG. 3.

In Step S1, the upper guide block 7 is elevated and halted at the upper elevation limit.

In Step S2, the clamp device 43 is lowered and the clamper 45 is positioned at the place where the upper guide block 7 was located.

In Step S3, the clamper 45 is closed to secure the wire electrode 1.

In Step S4, the magnetic clutch 23 is energized and the gear 25a is caused to engage the shaft 19 of the drive block 3a of the tension device 3.

In Step S5, the pulse motor 27 is caused to reverse (the direction of the solid arrow 70) by a predetermined number of revolutions, so that tension is applied to exceed the elastic limit of the wire electrode 1 between the tension roller 3b and the clamper 45, stretching the wire electrode 1.

In Step S6, the magnetic clutch 23 is released and the tension on the wire electrode 1 is eliminated. At this instant, the wire electrode 1 is straightened between the tension roller 31 of the tension device 3 and the clamper 45.

In Step S7, a specified electric current from the power device 63 is caused to flow to the wire electrode 1 between the clamper 45 and the electric element 33 of the upper guide block 7, applying heat to the wire electrode 1 to perform the melting.

In Steps S8, S9, and S10, the magnet clutch 23 is energized, the pulse motor 23 is reversed, and tension is applied until the wire electrode 1 separates.

In Steps S11, S12, and S13, the pulse motor 27 stops, the clutch 23 is released, and the electrical circuit for the wire electrode 1 is opened.

In Step S14, the clamp 45 is opened and the clamp device 43 returns to the home position.

In Step S15, the excess wire electrode which has been cut is removed by the take-up roller 15.

In Step S16, the upper guide block 7 descends to the home position. In this step, the cutting process of the wire threading operation is completed, and next, from Step S17 the threading to the new starting hole is performed.

In Step S17, the conveying device 13 and the take-up roller 15 are caused to operate.

In Steps S18 and S19, the clutch 23 is energized, the pulse motor 27 rotates in the forward direction (in the direction of the dotted arrow), and the wire electrode 1 is fed downward from the upper guide block 7.

In Step 20, the wire electrode 1 penetrates the workpiece W through a new starting hole in the workpiece W, passes through the lower guide block 11, and is inserted into the conveying device 13.

In Steps S21 and S22, a check is made to see if the wire electrode 1 has reached the conveying device 13 and the initial splice has been made. This is confirmed by a signal from the rotary encoder 31. In the case where the splice is not confirmed, the program returns to the initial Step S1.

In Steps 23 and 24, a check of the final thread is performed. In the case where no confirmation is made, it is concluded that there has been a breakdown after the conveying device 13, so the operation of the machine is halted.

In Steps S25 and S26, the pulse motor 27 and the magnetic clutch 23 are released, and the splicing operation is completed.

As can be understood from the foregoing explanation, in the method of present invention the wire is completely straightened after cutting. Accordingly, threading can be easily performed without using conventional auxiliary means.

Although the invention has been described in its preferred embodiments, it is to be understood that various changes and modifications may be made within the purview of the appended claims without departing from the true scope and spirit of the invention in its broader aspects.

What is claimed is:

1. A method of threading a wire electrode in a wire discharge machine having a normal advancement path, comprising the steps of:

straightening the wire electrode along said normal advancement path by applying tension force to said wire electrode;

melting a portion of the straightened wire electrode by passing an electrical current through said wire electrode;

separating the wire electrode at the melted portion thereof by applying tension force to the wire electrode; and inserting an end of the separated wire electrode into a through-hole in a workpiece;

wherein said wire discharge machine further includes a pulse motor mounted on a tension device, further including the step of applying said tension force by reversing said pulse motor.

2. A method of threading a wire electrode in a wire discharge machine having a normal advancement path, comprising the steps of:

straightening and separating the wire electrode along said normal advancement path by applying tension force exceeding the limit of elasticity of said wire electrode and passing an electric current through said electrode wire sufficient to melt said electrode wire; and inserting an end of the separated wire electrode into a through-hole in a workpiece;

wherein said wire discharge machine further includes a pulse motor mounted on the tension device, further including the step of applying said tension force by reversing said pulse motor.

3. A device for threading a wire electrode in a wire discharge machine having a normal advancement path, comprising:

pulse motor means for applying tension force to the wire electrode to straighten and separate the wire electrode along said normal advancement path;
means for inserting an end of a separated wire electrode into a through-hole in a workpiece; and
means for melting a portion of the straightened wire electrode by passing an electrical current through said wire electrode while applying tension force to the wire electrode by said pulse motor means, wherein said means for melting the portion of said straightened wire comprises:

wire guide means having conductive elements;
means for elevating said wire guide means along said normal advancement path;
clamp means for clamping said wire electrode;
means for causing said clamp means to move into and retreat from said normal advancement path so that said clamp means clamps said wire electrode before being elevated; and
a power supply device for applying electrical current to said conductive elements of said wire guide means and said clamp means.

* * * * *